April 4, 1967 H. GELLING 3,312,391
DEVICE FOR LIMITING THE DECIMALS OF THE MULTIPLICAND
IN A CALCULATING MACHINE
Filed June 11, 1964 4 Sheets-Sheet 4

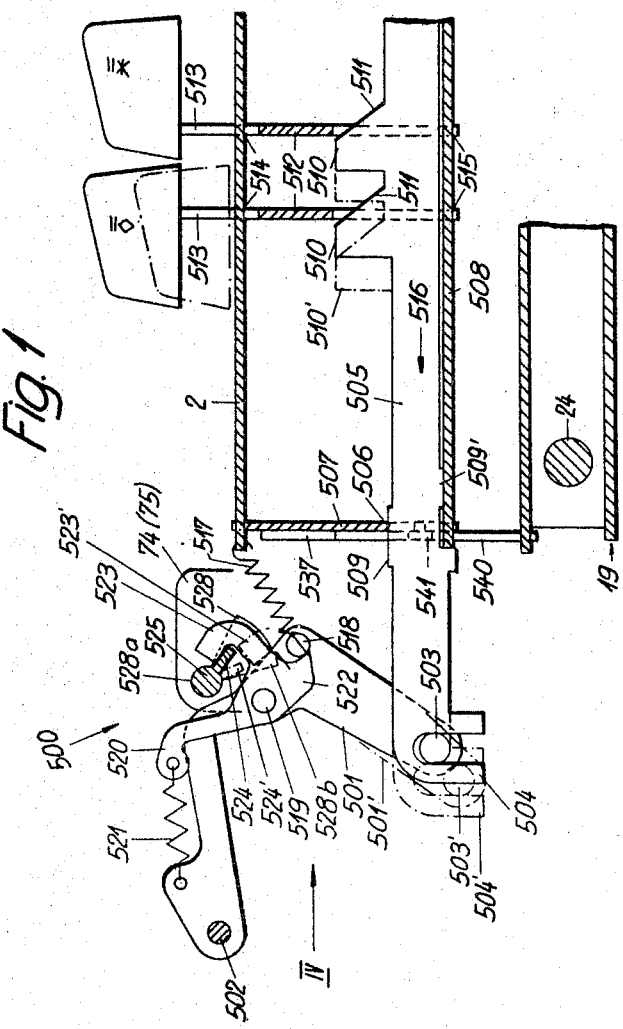

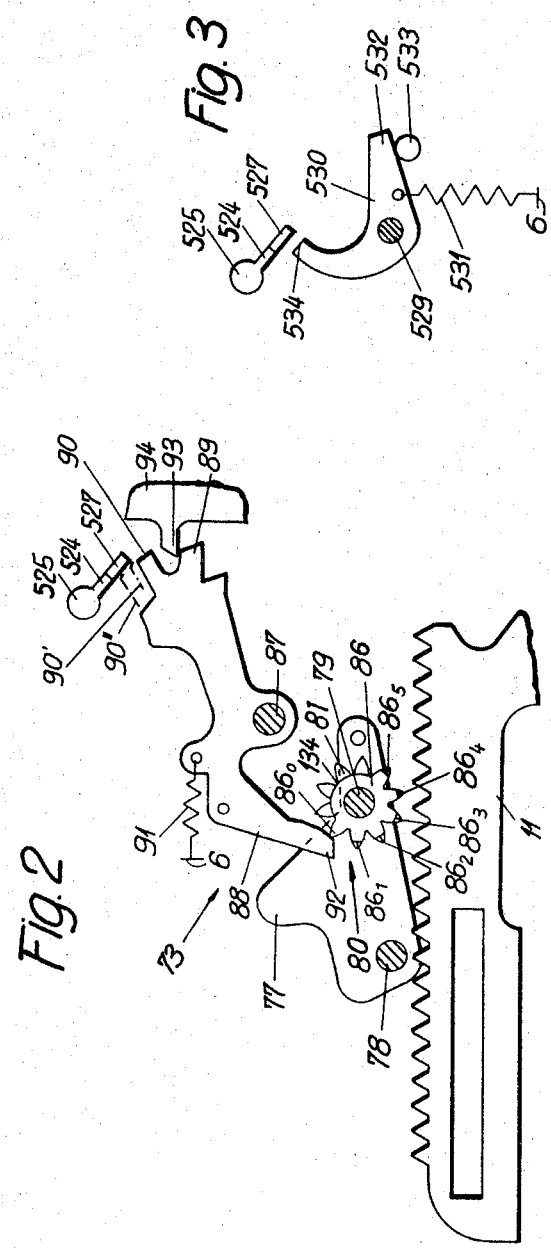

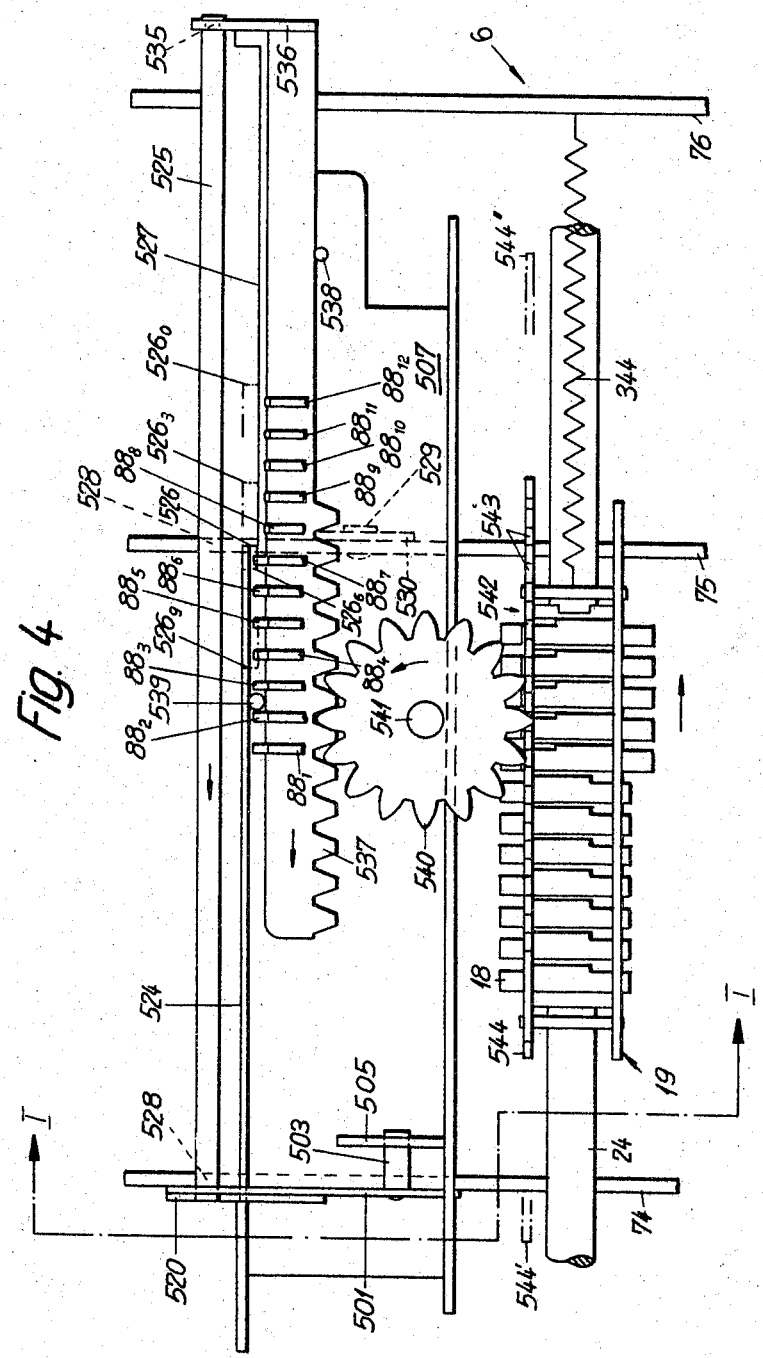

United States Patent Office 3,312,391
Patented Apr. 4, 1967

3,312,391
DEVICE FOR LIMITING THE DECIMALS OF THE MULTIPLICAND IN A CALCULATING MACHINE
Helmut Gelling, Dietlikon, near Zurich, Switzerland, assignor to Precisa A.G., Zurich, Switzerland
Filed June 11, 1964, Ser. No. 374,546
Claims priority, application Switzerland, June 12, 1963, 7,363/63
3 Claims. (Cl. 235—60)

The invention relates to improvements in calculating machines and particularly concerns a device for limiting the decimal points of the multiplicand on a calculating machine provided with a multiplier storage and for preventing operation of the machine when the product of the two entered factors exceed the capacity of the machine.

When it is desired to multiply in a calculating machine two numbers whose product exceeds the decimal point capacity of the calculating machine, then the result will be wrong. When one has entered into the machine the multiplier, the number of the decimal positions of the multiplicand has to be limited to the capacity of the calculating machine, and for this purpose it has been proposed heretofore to provide devices which indicate to the operator of the machine that the multiplicand entered has too many decimal points. This indication, however, takes place only after the multiplication operation has been completed, namely in that the product is indicated as being wrong. In a calculating machine equipped for instance with a printing device, there will appear next to the printed product the sign "Wrong." The operator then has to repeat the multiplication with a multiplicand having a smaller number of decimal points in order to obtain an approximate value for the product. These known limiting devices have the disadvantage that as a consequence of making the wrong multiplication a certain amount of time is lost.

It is an object of the invention to overcome this disadvantage.

The drawing illustrates by way of example one embodiment of the invention:

FIG. 1 is a longitudinal sectional view of a calculating machine along the broken line I—I in FIG. 4 and shows a limiting device for the number of decimal points of the multiplicand and also parts of a keyboard and a pin carriage;

FIG. 2 is another longitudinal sectional view which illustrates a multiplier storage which cooperates with the limiting device;

FIG. 3 shows a detail of the limiting device which is omitted from FIG. 1 to make the latter clearer;

FIG. 4 is a rear view of the parts shown in FIG. 1, namely in a view in the direction of the arrow IV in FIG. 1;

Figure 6:
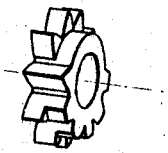
FIG. 6 is a perspective view of a storage wheel.
Figure 5:
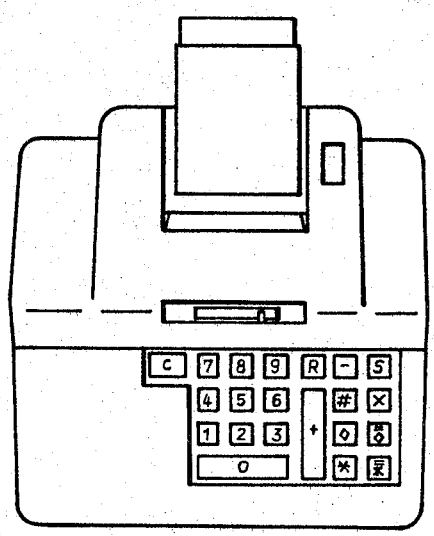
FIG. 5 is a top plan view of the calculating machine, showing the ten number keys and other details more fully described in applicant's copending application "multiplication device"

The limiting device of the invention is intended to be incorporated in a three species calculating machine which has a multiplier device which is disclosed in applicant's copending application Ser. No. 374,082 filed June 10, 1964. The multiplier device and the other parts of the calculating machine are described in the following specification only to such an extent as is necessary for an understanding of the limiting device of the present invention.

The calculating machine is provided with a keyboard of ten number keys and a plurality of operating keys. In FIG. 1 there is shown only two of these operating keys, all of which are arranged above the board 2. These two operating keys are designated with $\overline{\diamond}$ (intermediate sum product key) and $\overline{*}$ (end sum product key) respectively. The functions of these two keys will be explained hereinafter.

Below the keyboard is arranged a pin carriage 19 which is slidably supported for transverse travel. One of the supports which guides the pin carriage 19 comprises a rod 24 which is fixedly attached in a machine frame 6 provided with three parallel walls 74, 75 and 76. The pins 18 (FIG. 4) in the pin carriage 19 may be moved in a conventional manner by depressing the number keys from an upper inoperative or rest position into a lower operative position. In the operative position the pins 18 limit the path of movement of the rack bars 11 (see FIG. 2) in accordance with the particular key which was depressed. There are provided thirteen rack bars 11 which in FIG. 2 are arranged one behind the other. Twelve of these rack bars serve for the adjustment of the same number of storage gears 80 of a multiplier storage device 73, while the thirteenth rack bar is used only for adding. When performing an addition with the present calculating machine, one may use one more decimal point as when performing a multiplication, but this is basically of no importance.

The storage gears 80 are loosely rotatably mounted on a rod 79 which is mounted in a pivotally supported frame 77. The storage gears 80 have each a complete rim 81 of ten teeth and next to the storage gears is arranged a mutilated gear wheel 86. The frame 77 is pivotally mounted on a stationary rod 78 and from the illustrated position in FIG. 2 may be pivoted in a clockwise direction in order to cause the toothed rims 81 to engage the rack bars 11, so that the storage gears 80 by a movement of the rack bars 11 are adjusted according to the numbers of the multiplier.

After the frame 77 has been moved again rearwardly (counterclockwise) into the illustrated position, the mutilated gear wheel 86 is scanned by the scanning levers 88. The latter are pivotally mounted on a stationary rod 87 and are each urged into a counterclockwise direction by a spring 91 so that the scanning end 92 of each scanning lever 88 engages the mutilated gear wheel 86 of the corresponding storage gear 80. The mutilated gear wheel 86 has a tooth $86_0$ which has the same height as the teeth of the toothed rim 81; when the storage gear 80 is adjusted to the number "0," the tooth $86_0$ will be positioned below the scanning end 92 of the lever 88. The mutilated gear wheel 86 has also five teeth $86_1$, $86_2$, $86_3$, $86_4$ and $86_5$ which are only one half of the height of the tooth $86_0$; these shorter teeth correspond to the numbers 1, 2, 3, 4 and 5. The mutilated gear wheel 86 further has a toothless portion 134 which lies below the scanning end 92 when one of the number keys 6, 7, 8 or 9 has been depressed by the operator.

The scanning lever 88 has a nose portion 89 which is only then out of the way of a projection 93 on a transversally slidable carriage 94 connectable with the pin carriage 19, when the scanning end 92 rests on the tooth 86₀ of full height, that is, when the corresponding storage gear 80 is in the illustrated "0" position. The pin carriage 19 is acted upon by a spring 344 which according to the rear view of FIG. 4 exerts a pull force on the pin carriage in a direction toward the right. The latter, however, can follow the spring 344 only when the projection 93 of the carriage 94 does not engage a nose portion 89 of a scanning lever 88 which is not in the "0" position.

The calculating machine described in the foregoing operates in a multiplication operation substantially as follows:

At the start the first factor (multiplier) is entered into the pin carriage 19 by depressing the respective keys and the pin carriage, in known manner following the spring 344, moves on by one decimal point each time a number key is depressed. A subsequent operating of a not illustrated key called a multiplication key has the effect that the rack bars 11 are moved in accordance with the pin 18 being in the operative position and thereby the multiplier is entered in the multiplier storage 73. Now the second factor (multiplicand) is entered into the pin carriage 19 and one of the keys $\overline{\overline{*}}$ or $\overline{\overline{\diamond}}$ is depressed according to whether the product is desired to be printed on a paper strip as an end product or as an intermediate product. In the first case the computer of the calculating machine upon indicating the product is returned to zero, in the second case it remains in its instant position.

The product is formed within the computer in the usual manner by computing partial products according to the decimal points of the multiplier and adding these partial products. The partial products are obtained by the rack bars which are connected with the rack bars 11, but not with the multiplier storage 73, and in mesh with the computer are adjusted in accordance with the entered multiplicand as many times as the multiplier has decimals (normal multiplication method) or as the ten complement of this number calls for (abbreviated multiplication method). In the latter case the number of the next higher decimal place has to be increased by "1."

The multiplication device of the present invention works according to the abbreviated method and this is the reason that the teeth 86₁ to 86₅ which correspond to the numbers 1 to 5 have only half of the usual height, while the portion 134 of the mutilated gear wheel 86 which corresponds to the numbers 6 to 9 has no teeth at all. The storage wheels 80 are moved back to the "0" position by a stepwise rotation in a counterclockwise direction when one of the numbers 1 to 5 have been entered, and by a stepwise rotation in a clockwise direction when one of the numbers 6 to 9 has been entered. This, however, is of no consequence for the limiting device which in the following is designated with 500 and which forms the subject matter of the present invention and will be described hereinafter. This limiting device 500 may as well be used in connection with a multiplication device according to the normal method in which the gear wheel 86 for instance, except for the tooth 86₀, has no teeth at all, and the storage wheel 80 in order to return from one of its positions "1" to "9" to the zero position has to be rotated always in the same direction. As will be noted from the following disclosure, however, it is essential that in both types of multiplication devices the scanning lever 88 upon adjustment of the storage wheel 80 to the number "0" assumes a different position than upon adjustment to any other of the remaining numbers.

The limiting device 500 is provided with a curved arm 501 (FIGS. 1 and 4) which is pivotally mounted with its upper left hand end on a stationary pin 502 and carries on its lower free end a pin 503. The pin 503 is in engagement with a fork 504 (FIG. 1) of a slidable bar 505 which extends through a slot 506 in a wall 507 and is guided in this slot 506 and along a bottom wall 508 which is arranged parallel to the keyboard 2. 509 and 509' are the upper and lower guide projections of the sliding bar 505. The slidable bar 505 is provided with two projections 510 extending upwardly and each has an inclined front edge 511 at the right side as shown in FIG. 1. These edges 511 are adapted to cooperate with vertically extending arms 512 normal to the drawing plane of vertically displaceable bars 513. On the upper ends of the two bars 513, which extend through openings 514 and 515 in the keyboard 2 and the bottom wall 506, respectively, are mounted the two keys $\overline{\overline{\diamond}}$ and $\overline{\overline{*}}$ respectively. If one of these keys is depressed, the respective arm 512 engages the respective inclined edge 511 and thereby displaces the horizontally slidable bar 505 in the direction of the arrow 516, as is indicated in dash-dotted lines 510' and 504'.

When the slidable bar 505 is displaced by depressing one of the keys $\overline{\overline{\diamond}}$ or $\overline{\overline{*}}$—which is not always possible as will be shown later—it also moves the pin 503 to the position 503' so that the arm 501 is moved in a clockwise direction (FIG. 1) into the position 501'. A spring 517 mounted between a pin 518 on the arm 501 and the keyboard 2 is provided to return the arm 501 to its starting position.

The arm 501 has pivotally attached thereto between its ends at 519 a locking pawl 520 which is rotated by a spring 521 in a counterclockwise direction with respect to the arm 501 until a projection 522 of the locking pawl 520 abuts the pin 518. The locking pawl 520 furthermore is provided with an upwardly directed hook 523 near its lower end. This hook surrounds a bar 524 which is illustrated in its rest position in full lines and is arranged on a pivotally and longitudinally displaceably mounted rod 525. The bar 524 at its right hand end has a shoulder 526 (FIG. 4) and owing to the latter is provided with a wider right hand portion 527. Apertures 528 in the spaced vertical walls 74 and 75 serve for mounting the rod 525, each aperture having an approximately circular portion 528a through which the rod 525 extends with some clearance, and a sector shaped portion 528b which permits the bar 524, 527 to pivot.

To the wall 75 (see FIG. 4) is attached a pin 529 on which is pivotally mounted a lever 530 which according to FIG. 3 is acted upon by a spring 531 which normally retains one end 532 of the lever 530 in engagement with a stationary pin 533, the other lever end 534 being positioned with some clearance adjacent the bar 527. It will be noted that when the bar 524, 527 is rotated clockwise (see FIG. 3), the lever 530 is rotated counterclockwise against the action of the spring 531 and seeks to rotate the bar 524, 527 back into its normal position illustrated in FIG. 3. On the other hand, however, the lever 530 in this normal position produces no friction which would retard the axial displacement of the rod 525 as it does not come into engagement with the bar 527.

The above disclosed elements of the limiting device 500 collaborate with the multiplier storage 73 in the following manner:

FIG. 2 shows that the wider bar portion 527 can be rotated about the axis of its integral rod portion 525 from its disclosed normal position in clockwise direction only when the scanning lever 88 or the storage wheel 80, respectively, is in the disclosed "0" position. If the scanning end 92 engages, however, one of the short teeth 86₁ to 86₅ or the toothless portion 134 of the mutilated gear wheel 86, then the nose 90 is in the position 90' or 90" and in both of these positions the bar 527 in an attempt to rotate in a clockwise direction abuts the nose 90, provided the nose 90 is positioned below the bar 527 which depends on the axial sliding position of the latter. The bar portion 524, however, is so narrow that in no case the nose 90 is able to prevent it from a clockwise movement.

If upon entering the multiplier, operating the multiplication key and entering the multiplicand one of the two keys $\lozenge$ or $*$ is depressed, the two following situations are possible.

*Case 1.*—All scanning levers 88, whose noses 90 lie below the wider bar portion 527, are in the "0" position. In this case the arm 501 by depressing the key $\lozenge$ or $*$ is moved in a clockwise direction by means of the elements 513, 512, 511, 505, 504, 503 in a manner described previously. Thereby the hook 523 of the locking pawl 520 takes along the narrow bar 524 so that the same is moved clockwise and into a secondary position designated with 524' where the hook 523 slides off the bar 524 and assumes the position designated with 523'. After the depressed key has effected the formation of the product and the printing of the same as an intermediary or end sum, the key returns to its rest position so that by the action of the spring 517 the arm 501 and therewith also the slide bar 505 are returned to their initial position. The hook 523 of the locking pawl 520 strikes the bar 524 which is now back in its normal position, but is able to evade it in that the locking pawl 520 pivots in a clockwise direction relative to the arm 501, whereupon also the locking pawl 520 returns to its normal position by the action of the spring 521.

*Case 2.*—It is assumed that at least one scanning lever 88 whose nose lies below the wider bar portion 527, is not in the "0" position. That means the nose 90 is in the position 90' or 90" (see FIG. 2) and prevents the rotation of the bar 524, 527 so that in turn the bar portion 524 is prevented from being clockwise taken along by the hook 523. Consequently, the arm 501 cannot be moved into the position 501', and the slidable bar 505 cannot be displaced in the direction of the arrow 516 by depressing the keys $\lozenge$ or $*$. These keys therefore cannot follow the pressure exerted upon them and thus cannot effect the formation of the product. Therefore, the locking pawl 520 ultimately prevents the operation of the keys $\lozenge$ and $*$.

In the following, there will be described the locking of the keys $\lozenge$ and $*$ which occurs when the multiplicand entered as a second factor has so many decimal places that in view of the number of decimal places of the multiplier entered as first factor the product would exceed the decimal capacity of the calculating machine.

The rod 525 according to FIG. 4 has pivoted thereto at its right hand end at 535 a connector member 536 which is attached to the right hand end of a rack bar 537 which is slidably arranged along the vertical wall 507. Two pins 538 and 539 which are fastened to the wall 507 are provided for guiding the rack bar 537. The rack bar 537 is further supported and guided by a gear wheel 540 which is engaged from above by the rack bar 537. The gear wheel 540 is journalled on a pin 541 fixed to the wall 507 and meshes at its lower portion with a straight gear 542 formed by a row of rectangular apertures 543. The latter are provided in the upper horizontal plate 544 of the pin carriage 19. The pin carriage 19 is able to move along the guide rod 24 between two end positions, as is indicated at 544' and 544" for the left and for the right end, respectively, of its upper plate 544.

When the pin carriage 19 following the tension of the spring 344 moves toward the right, when viewing FIG. 4, the gear wheel 540 moves the rack bar 537 toward the left, moving the rod 525 with the bar 524, 527 to the left, as is indicated by arrows.

FIG. 4 proceeds from the assumption that a 6 digit multiplier has been entered in the multiplier storage 73, e.g. the number 253411, so that the noses 90 of the first seven scanning levers $88_1$ to $88_7$ are lifted relative to the "0" position to an extent as corresponds to the position 90' of FIG. 2, whereas the other five scanning levers $88_8$ to $88_{12}$ are in the "0" position. When the multiplier is entered into the multiplier storage 73, the bar 527 is in its normal position in which, as will be noted from FIG. 2, it cannot stop the scanning lever noses 90 from moving into the positions 90' (or 90") even if it—the bar 527—is above the scanning lever noses 90.

Upon registering the multiplier in the multiplier storage 73 by depressing the multiplication key, the pin carriage 19 is moved in the usual manner against the action of the spring 344 into its left end position (initial position) as indicated at 544' and at the same time is cleared, whereupon the multiplicand is entered into the pin carriage 19. In FIG. 4 it is assumed that a five digit multiplicand has been entered, whereby the pin carriage 19 has followed the tension of the spring 344 stepwise to the right and the rack bar 537 with the shaft 525 has moved correspondingly to the left. During this procedure the shoulder 526 between the bar portions 524 and 527 has moved from its "0" position designated with $526_0$ and illustrated in dash-dotted lines, to the position illustrated in full lines. In this position only the wider bar portion 527 is located above the noses 90 of the scanning levers $88_8$ to $88_{12}$ which are in the "0" position.

If now one of the keys $\lozenge$ or $*$ is depressed, the bar portion 527 by way of the locking pawl 520 will not prevent the key from following the pressure exerted upon it, as has been described under "Case 1." The product of the seven digit multiplier and the five digit multiplicand produces at the most a twelve digit number which the computer and the printing mechanism of the calculating machine are capable of processing.

It may now be assumed that a six digit multiplicand is entered instead of one having five digits. In such a case the shoulder 526 moves on to the position $526_6$. The wider bar portion 527 is moved to lie above the nose 90 of the scanning lever $88_7$ which is not in the "0" position and this results—as is described under "Case 2"—in a locking of the keys $\lozenge$ and $*$. The operator will immediately realize that he expects a multiplication which exceeds the capacity of the machine, and he will be able to cancel the entered multiplicand and to reset the machine to a multiplicand having less digits.

It will be obvious that for instance with a three or nine digit multiplier the shoulder 526 is able to move up to the position $526_9$ or $526_3$, respectively, without locking the keys $\lozenge$ and $*$. This means that 9 and 3 digit multiplicands are still permissible, while multiplicands of lesser digits of course can also be used.

If the last digit or digits of the multiplier is 0, this 0 is ineffective, because the respective scanning levers are then neither able to stop the shift carriage with the pin box, nor can they prevent a rotative movement of the bar portion 527; in other words, if a multiplier of e.g. 5400 is set, the machine computes in reality with the multiplier 54.

The opposite movement between the rod 525 and the pin carriage 19 may also be achieved in a different fashion than with a gear wheel 540 and the two rack bars 537 and 542 which latter are in engagement with said gear wheel. For instance, it is possible to provide an endless chain the lower and upper runs of which may be coupled to the pin carriage and the rod 525, respectively. The described gear mechanism 542, 540, 537, however, is a particular simple and space saving mechanism for producing the opposite movements.

It is pointed out that the device of the invention is also employable when the multiplier storage is provided not only with one, but with two rows of storage wheels connected by a decimal gear transmission, in which the storage wheels of one of these rows then cooperate with scanning members equivalent to the scanning levers 88.

I claim:
1. In a calculating machine, the combination of
   (a) a multiplier storage provided with at least one row of storage wheels and scanning members co-operating with the same,
   (b) a pin carriage having a top wall,
   (c) a keyboard having number keys and operating keys,
   (d) a device associated with said calculating machine for limiting the decimal number of the multiplicand and preventing operation of the machine when the product of the two entered factors exceed the capacity of the machine,
   (e) means for returning said storage wheel to a zero position during the formation of the product, whereby for performing a multiplication first the multiplier is entered into said multiplier storage and then the multiplicand is entered into said pin carriage, and thereupon one of said operating keys is actuated which latter releases the operations of the machine for forming the product,
   (f) a lengthwise movable bar (527) operatively connected with said pin carriage (19) for moving said bar and pin carriage simultaneously in opposite directions,
   (g) means for causing said bar to cooperate on one hand with said scanning members (88) of said storage wheels (80) and on the other hand with
   (h) a locking member (520) which by means of a linkage (501, 505, 513) is connected with at least one of said operating keys ($\overline{\overline{\diamondsuit}}$, $\overline{\overline{*}}$) which latter after the entering of the multiplicand into said pin carriage permits the formation of the product, said locking member (520) being effective to prevent the actuation of said operating key when one of said scanning members is not in its zero position, in which event said bar (527) is moved in a direction at right angles to its lengthwise direction, said actuation of said operating key being prevented when the sum of the effective decimal points of the multiplier and the multiplicand exceeds the number of said scanning members (88) and a gear transmission (537, 540, 542) arranged between said lengthwise movable bar (527) and pin carriage (19) for effecting their movements in opposite directions, said gear transmission comprising a rack bar (537) movable with said movable bar, a row of equidistantly spaced openings in said top wall of said pin carriage forming gear teeth (543) on said pin carriage beneath said rack bar, and a gear wheel (540) interposed therebetween in meshing engagement with said rack bar, said gear wheel having its opposed teeth extending into driving engageemnt with said openings forming said gear teeth on said pin carriage.

2. In a calculating machine, the combination of
   (a) a multiplier storage provided with at least one row of storage wheels and scanning members co-operating with the same,
   (b) a pin carriage having a top wall,
   (c) a keyboard having number keys and operating keys,
   (d) a device associated with said calculating machine for limiting the decimal number of the multiplicand, and preventing operation of the machine when the product of the two entered factors exceed the capacity of the machine,
   (e) means for returning said storage wheel to a zero position during the formation of the product, whereby for performing a multiplication first the multiplier is entered into said multiplier storage and then the multiplicand is entered into said pin carriage, and thereupon one of said operating keys is actuated which latter releases the operations of the machine for forming the product,
   (f) a lengthwise movable bar (527) operatively connected with said pin carriage (19) for moving said bar and pin carriage simultaneously in opposite directions,
   (g) means for causing said bar to cooperate on one hand with said scanning members (88) of said storage wheels (80) and on the other hand with
   (h) a locking member (520) which by means of a linkage (501, 505, 513) is connected with at least one of said operating keys ($\overline{\overline{\diamondsuit}}$, $\overline{\overline{*}}$) which latter after the entering of the multiplicand into said pin carriage permits the formation of the product, said locking member (520) being effective to prevent the actuation of said operating key when one of said scanning members is not in its zero position, in which event said bar (527) is moved in a direction at right angles to its lengthwise direction, said actuation of said operating key being prevented when the sum of the effective decimal points of the multiplier and the multiplicand exceeds the number of said scanning members (88) and a gear transmission (537, 540, 542) arranged between said lengthwise movable bar (527) and pin carriage (19) for effecting their movements in opposite directions, said gear transmission comprising a straight rack bar (537) movable with said lengthwise movable bar, said top wall of said pin carriage having a row of openings forming a series of gear teeth (543), and a gear wheel (540) meshing with said rack bar and said row of openings forming said gear teeth, said lengthwise movable bar (527) being attached to a rod (525) which is rotatably mounted and extends parallel to said bar, said rod (525) being operatively coupled to said rack bar (537) forming a part of said gear transmission.

3. In a calculating machine, the combination of
   (a) a multiplier storage provided with at least one row of storage wheels and scanning members cooperating with the same,
   (b) a pin carriage having a top wall,
   (c) a keyboard having number keys and operating keys,
   (d) a device associated with said calculating machine for limiting the decimal number of the multiplicand and preventing operation of the machine when the product of the two entered factors exceed the capacity of the machine,
   (e) means for returning said storage wheel to a zero position during the formation of the product, whereby for performing a multiplication first the multiplier is entered into said multiplier storage and then the multiplicand is entered into said pin carriage, and thereupon one of said operating keys is actuated which latter releases the operations of the machine for forming the product,
   (f) a lengthwise movable bar (527) operatively connected with said pin carriage (19) for moving said bar and pin carriage simultaneously in opposite directions,
   (g) means for causing said bar to cooperate on one hand with said scanning members (88) of said storage wheels (80) and on the other hand with
   (h) a locking member (520) which by means of a linkage (501, 505, 513) is connected with at least one of said operating keys ($\overline{\overline{\diamondsuit}}$, $\overline{\overline{*}}$) which latter after the entering of the multiplicand into said pin carriage permits the formation of the product, said locking member (520) being effective to prevent the actuation of said operating key when one of said scanning members is not in its zero position, in which event said bar (527) is moved in a direction at right angles to its lengthwise direction, said actuation of said operating key being prevented when the sum of the effective decimal points of the multiplier and the multiplicand exceeds the number of said scanning members (88), a gear transmission (537, 540, 542) arranged between said lengthwise movable bar (527) and pin carriage (19) for effecting their movements in opposite directions, said gear transmission comprising a straight rack bar (537) movable with said lengthwise movable bar and said top wall having a row of openings in the top wall of said pin carriage forming gear teeth (543) on said pin carriage, and a gear wheel (540) rotatably mounted between said rack bar and pin carriage meshing with both said rack bar and said row of openings forming said gear teeth.

References Cited by the Examiner
UNITED STATES PATENTS

| | | | |
|---|---|---|---|
| 2,952,406 | 9/1960 | Capellaro et al. | 235—63 |
| 3,005,585 | 10/1961 | Capellaro et al. | 235—63 |
| 3,188,003 | 6/1965 | Gang | 235—60 |
| 3,194,495 | 7/1965 | Gang | 235—60.15 |

STEPHEN J. TOMSKY, *Primary Examiner.*